(12) United States Patent
Wang et al.

(10) Patent No.: US 12,195,367 B2
(45) Date of Patent: Jan. 14, 2025

(54) ELECTROLYTIC MODULE UNITS AND WATER TREATMENT SYSTEMS BASED ON BORON-DOPED DIAMOND (BDD) ELECTRODES

(71) Applicants: JIANGXI XINYUAN NEW MATERIAL TECHNOLOGY CO., LTD., Jiangxi (CN); SINOMA SYNTHETIC CRYSTALS (SHANDONG) CO., LTD., Shandong (CN); SHANDONG XINYUAN NEW MATERIAL TECHNOLOGY CO., LTD., Shandong (CN)

(72) Inventors: Yubao Wang, Jinan (CN); Xiaobo Zhao, Jinan (CN); Jinchang Xu, Fuzhou (CN); Yanxin Cao, Jinan (CN); Xiaoling Wang, Jinan (CN); Xinwei Zhang, Jinan (CN); Mingzhao Liu, Jinan (CN); Jingqun Zhang, Jinan (CN); Peng Zi, Shandong (CN); Chuanqi Wang, Jinan (CN); Huayang Wei, Jinan (CN)

(73) Assignees: JIANGXI XINYUAN NEW MATERIAL TECHNOLOGY CO., LTD., Fuzhou (CN); SINOMA SYNTHETIC CRYSTALS (SHANDONG) CO., LTD., Jinan (CN); SHANDONG XINYUAN NEW MATERIAL TECHNOLOGY CO., LTD., Jinan (CN)

( * ) Notice: Subject to any disclaimer, the term of this patent is extended or adjusted under 35 U.S.C. 154(b) by 0 days.

(21) Appl. No.: 18/735,154

(22) Filed: Jun. 5, 2024

(65) Prior Publication Data

US 2024/0317613 A1    Sep. 26, 2024

Related U.S. Application Data

(63) Continuation of application No. PCT/CN2022/113836, filed on Aug. 22, 2022.

(30) Foreign Application Priority Data

Jan. 20, 2022  (CN) .......................... 202210064023.3

(51) Int. Cl.
C02F 1/461   (2023.01)
C02F 1/00    (2023.01)

(52) U.S. Cl.
CPC .......... C02F 1/46109 (2013.01); C02F 1/001 (2013.01); *C02F 2001/46123* (2013.01);
(Continued)

(58) Field of Classification Search
None
See application file for complete search history.

(56) References Cited

U.S. PATENT DOCUMENTS

| 5,114,547 A | 5/1992 | Ullman |
| 2002/0083842 A1 | 7/2002 | Kown |

(Continued)

FOREIGN PATENT DOCUMENTS

| CN | 1048732 A | 1/1991 |
| CN | 1454185 A | 11/2003 |

(Continued)

OTHER PUBLICATIONS

First Office Action in Chinese Application No. 202210064023.3 mailed on Sep. 2, 2022, 19 pages.

(Continued)

*Primary Examiner* — Louis J Rufo
(74) *Attorney, Agent, or Firm* — PORUS IP LLC (57) ABSTRACT

The present disclosure provides an electrolytic module unit based on a boron-doped diamond (BDD) electrode, including a water flow guide module and an electrolytic module. The electrolytic module is provided within the water flow guide module. The electrolytic module includes a BDD (Continued)

Structure with round tube type    Structure with duckbill type    Liquid-splitting structure electrode including a main body portion and a plurality of branch portions disposed on two sides of the main body portion. The main body portion and the plurality of branch portions on two sides of the main body portion constitute a fishbone-like structure. The BDD electrode of the electrolytic module unit is of the fishbone-like structure.

9 Claims, 5 Drawing Sheets

(52) U.S. Cl.
CPC .............. *C02F 2001/46142* (2013.01); *C02F 2001/46147* (2013.01); *C02F 2001/46152* (2013.01); *C02F 2201/4611* (2013.01); *C02F 2201/46115* (2013.01); *C02F 2201/46145* (2013.01); *C02F 2201/4619* (2013.01); *C02F 2209/02* (2013.01); *C02F 2209/03* (2013.01)

(56) References Cited

U.S. PATENT DOCUMENTS

| | | | | |
|---|---|---|---|---|
| 2010/0006450 | A1* | 1/2010 | Whitehead | C25B 1/13 205/742 |
| 2019/0055144 | A1* | 2/2019 | Inagaki | C02F 1/46114 |
| 2021/0155509 | A1 | 5/2021 | Inagaki et al. | |

FOREIGN PATENT DOCUMENTS

| | | |
|---|---|---|
| CN | 103255432 A | 8/2013 |
| CN | 203803398 U | 9/2014 |
| CN | 204550152 U | 8/2015 |
| CN | 210736908 U | 6/2020 |
| CN | 111646633 A | 9/2020 |
| CN | 112313176 A | 2/2021 |
| CN | 112359372 A | 2/2021 |
| CN | 112723910 A | 4/2021 |
| CN | 213834682 U | 7/2021 |
| CN | 114314769 A | 4/2022 |
| JP | 6170266 B1 | 7/2017 |
| JP | 6220956 B1 | 10/2017 |
| KR | 20150055929 A | 5/2015 |
| WO | 2012156671 A2 | 11/2012 |
| WO | WO-2012157236 A1 * | 11/2012 .............. B01J 47/04 |

OTHER PUBLICATIONS

Notification to Grant Patent Right for Invention in Chinese Application No. 202210064023.3 mailed on Mar. 17, 2023, 6 pages.
International Search Report in PCT/CN2022/113836 mailed on Nov. 9, 2022, 7 pages.
Written Opinion in PCT/CN2022/113836 mailed on Nov. 9, 2022, 7 pages.

* cited by examiner

Structure with round tube type

Structure with duckbill type

Liquid-splitting structure

FIG. 5

ELECTROLYTIC MODULE UNITS AND WATER TREATMENT SYSTEMS BASED ON BORON-DOPED DIAMOND (BDD) ELECTRODES

CROSS-REFERENCE TO RELATED APPLICATIONS

This application is a Continuation of International Application No. PCT/CN2022/113836, filed on Aug. 22, 2022, which claims priority to Chinese Patent Application No. 202210064023.3, filed on Jan. 20, 2022, the entire contents of each of which are hereby incorporated by reference.

TECHNICAL FIELD

The present disclosure relates to the field of electrochemical technology, and in particular, to electrolytic module units based on boron-doped diamond (BDD) electrodes and water treatment systems.

BACKGROUND

Boron-doped diamond (BDD) electrodes are BDD electrodes made by depositing a boron-doped diamond film on a substrate using vapor deposition. After the BDD electrodes are energized, effective components produced by electrolysis in water are ozone and hydroxyl radicals, which may be configured to oxidize and treat viruses, bacteria, organic pollutants, etc. The BDD electrodes, in addition to having high potential for oxygen precipitation and high electrocatalytic activity, also have excellent chemical stability and are resistant to electrode depletion caused by electrochemical corrosion during long-term electrolytic applications. Therefore, the BDD electrodes are widely used in disinfection, sterilization, and water treatment. For example, the BDD electrodes are used in spray bottles, humidifiers, dishwashers, washing machines, air purifiers, water purifiers, deodorizers, sewage treatment machines, or the like.

However, an existing BDD electrode technology also suffers from the following problems.

Firstly, a structural form of the existing BDD electrode is a two-dimensional flat plate. Processing manners such as sandblasting, laser perforation cutting, water jetting, chemical etching are generally used to process a surface and the structural form of the BDD electrodes to increase a surface area and improve reaction efficiency. However, these processing manners are usually prone to processing stresses (e.g., caused by laser punch cutting), which affects mechanical strength and has low processing efficiency.

Figure 1:
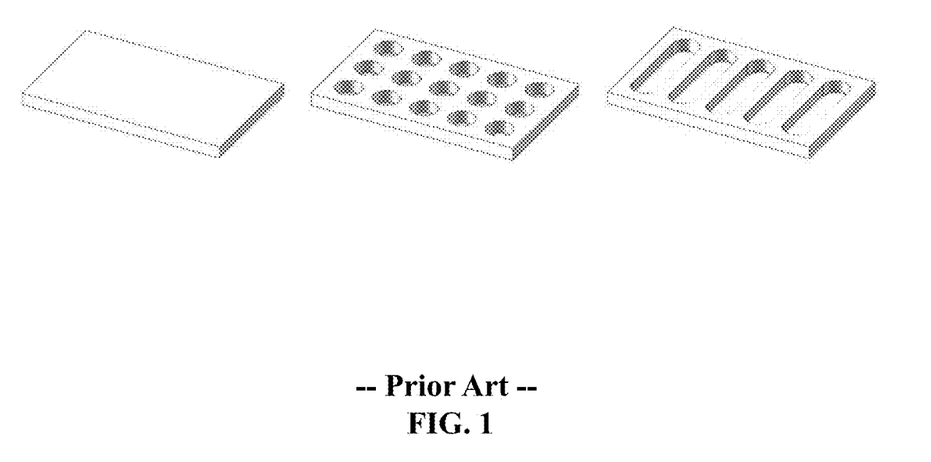
FIG. 1 is a schematic diagram illustrating an exemplary structure of an electrode commonly used for a two-dimensional plate-like boron-doped diamond (BDD) electrode in prior art.
Figure 2:
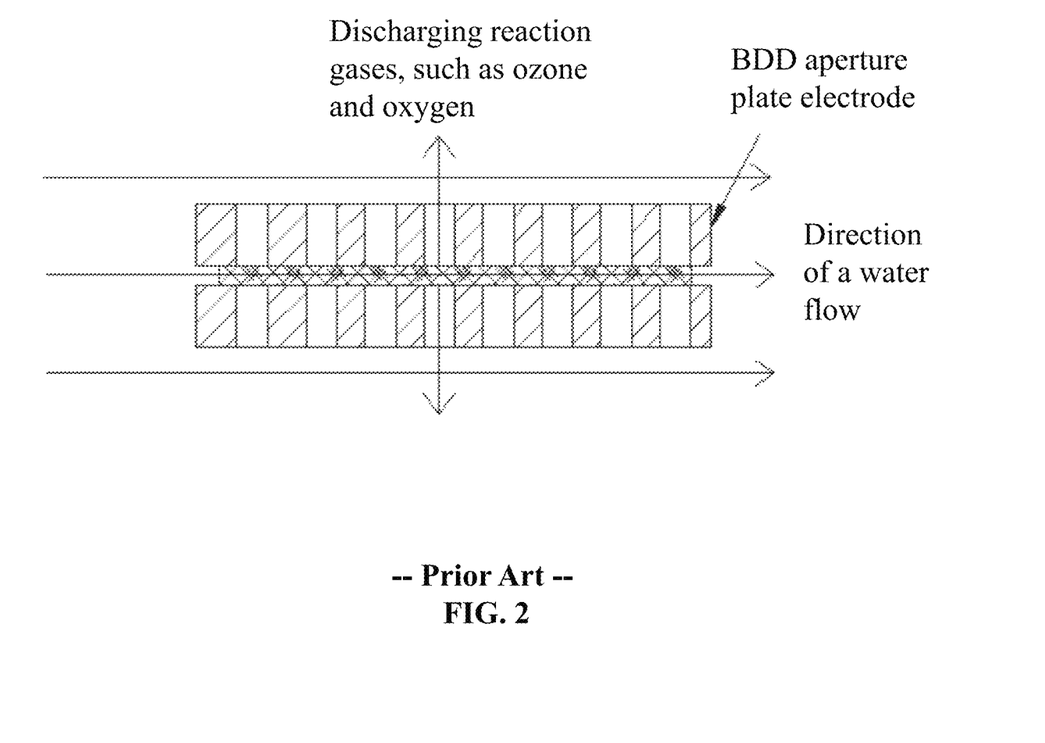
FIG. 2 is a schematic diagram illustrating an exemplary structure of a water flow direction and an exhaust direction during electrolysis of a two-dimensional plate-like BDD electrode in prior art.

Secondly, a commonly used electrode structure of a two-dimensional plate-like BDD electrode is generally a pure plate, a hole plate, etc. (as shown in FIG. 1). When applied, a water flow direction is perpendicular to an exhaust direction (as shown in FIG. 2). As a result, hydrogen and ozone, etc. produced by an electrolytic module unit in a working process are difficult to discharge on time, which reduces an effective working area and prevents an electrolytic reaction from proceeding efficiently. In addition, when water to be treated contains particulate matter, or when impurities are deposited during an electrochemical reaction process, the particulate matter and impurities tend to block a vent (or a tank) and reduce electrolytic efficiency.

SUMMARY

One or more embodiments of the present disclosure provide an electrolytic module unit based on a boron-doped diamond (BDD) electrode. The electrolytic module unit includes a water flow guide module and an electrolytic module. The electrolytic module is provided within the water flow guide module. The electrolytic module includes a BDD electrode. The BDD electrode includes a main body portion and a plurality of branch portions disposed on two sides of the main body portion. The main body portion and the plurality of branch portions on the two sides of the main body portion constitute a fishbone-like structure.

In some embodiments of the present disclosure, a distance between adjacent branch portions is within a range of 0.05 mm-2.5 mm. A width of each of the plurality of the branch portions is within a range of 0.05 mm-10 mm. An angle between the each of the plurality of the branch portions and the main body portion is within a range of 0°-90°. The main body portion is oriented in a direction of an end portion of the fishbone-like structure.

In some embodiments of the present disclosure, the BDD electrode is made by depositing a boron-doped diamond film on a substrate of the fishbone-like structure. A material of the substrate includes one of titanium, niobium, tantalum, nickel, monocrystalline silicon, polycrystalline silicon, silicon carbide monocrystal, silicon carbide ceramics, silicon nitride monocrystal, and silicon nitride ceramics. The substrate is processed by a diamond wire cutting manner.

In some embodiments of the present disclosure, the BDD electrode includes a BDD electrode acting as an anode and a BDD electrode acting as a cathode, and an ionic membrane is provided between the BDD electrode acting as the anode and the BDD electrode acting as the cathode.

In some embodiments of the present disclosure, the water flow guide module includes a main inlet guide tube, a cavity, and a plurality of sub-inlet guide tubes. The cavity is communicated with the main inlet guide tube and two sides of the cavity are perpendicular to the main inlet guide tube. The plurality of sub-inlet guide tubes are communicated with the cavity and the main inlet guide tube, and a communicated end of each of the plurality of sub-inlet guide tubes communicated with the cavity is perpendicular to an upper surface of the cavity or a lower surface of the cavity. The electrolytic module is arranged in the cavity and parallel to the upper surface and the lower surface of the cavity, and an end portion of the BDD electrode of the fishbone-like structure is far away from a direction of the main inlet guide tube.

In some embodiments of the present disclosure, a ratio of a diameter of the sub-inlet guide tube to a diameter of the main inlet guide tube is within a range of 1:1-1:20.

In some embodiments of the present disclosure, a water flow in the sub-inlet guide tube is controlled by a switch having pulse control characteristics.

In some embodiments of the present disclosure, one end of the sub-inlet guide tube communicated with the cavity is a structure with round tube type, a structure with duckbill type, or a liquid-splitting structure.

One or more embodiments of the present disclosure further provide a water treatment system, including the electrolytic module unit as described in any one of the foregoing embodiments. The water treatment system further includes a filtration module and a gas-liquid mixing module. The electrolytic module unit is located between the filtration module and the gas-liquid mixing module, the electrolytic module unit is communicated with the filtration module through an inlet channel, and the electrolytic module unit is communicated with the gas-liquid mixing module through an outlet channel.

In some embodiments of the present disclosure, the filtration module includes a backwash function, and a diameter of a filtration membrane of the filtration module is within a range of 0.2-75 μm. The gas-liquid mixing module uses microporous aeration and/or spiral mixing to mix liquid and gas. A ratio of a cross-sectional area of the inlet channel between the filtration module and the electrolytic module unit to a cross-sectional area of the outlet channel between the gas-liquid mixing module and the electrolytic module unit is within a range of 1:3-20:1.

BRIEF DESCRIPTION OF THE DRAWINGS

The present disclosure is further illustrated in terms of exemplary embodiments. These exemplary embodiments are described in detail with reference to according to the drawings. These embodiments are non-limiting exemplary embodiments, in which like reference numerals represent similar structures, and wherein.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with the accompanying drawings without creative labor. Unless obviously obtained from the context or the context illustrates otherwise, the same numeral in the drawings refers to the same structure or operation.

It should be understood that the terms "system", "device", "unit" and/or "module" as used herein is a way to distinguish between different components, elements, parts, sections or assemblies at different levels. However, the words may be replaced by other expressions if other words accomplish the same purpose.

As shown in the present disclosure and the claims, unless the context clearly suggests an exception, the words "a," "an," "one," "one kind," and/or "the" do not refer specifically to the singular but may also include the plural. Generally, the terms "including," and "comprising" suggest only the inclusion of clearly identified steps and elements that do not constitute an exclusive list, and the method or device may also include other steps or elements.

Figure 3:
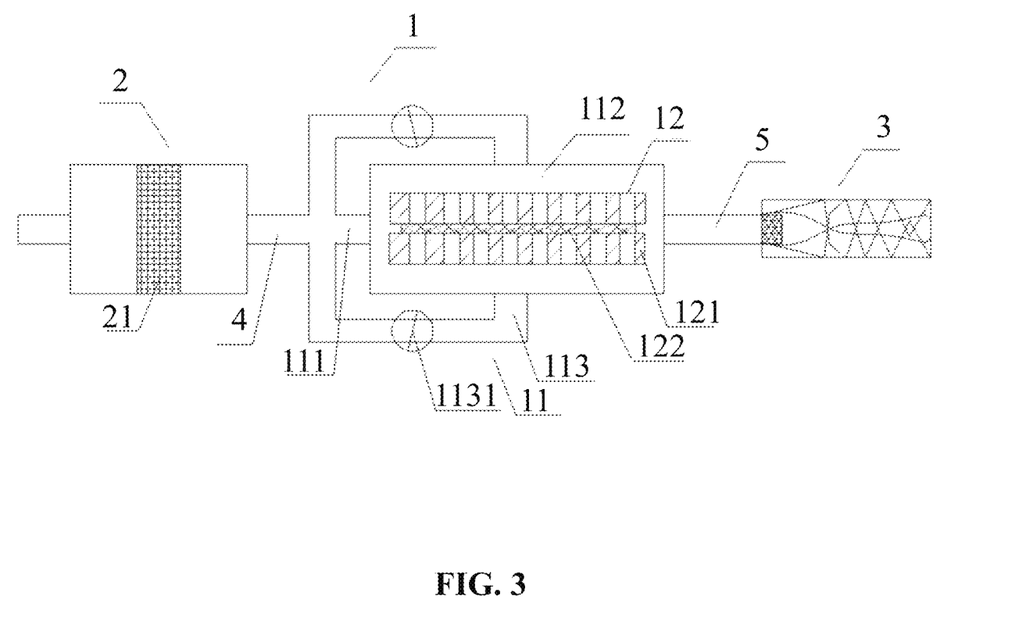
FIG. 3 is a schematic diagram illustrating an exemplary structure of a water treatment system according to some embodiments of the present disclosure.
Figure 4:
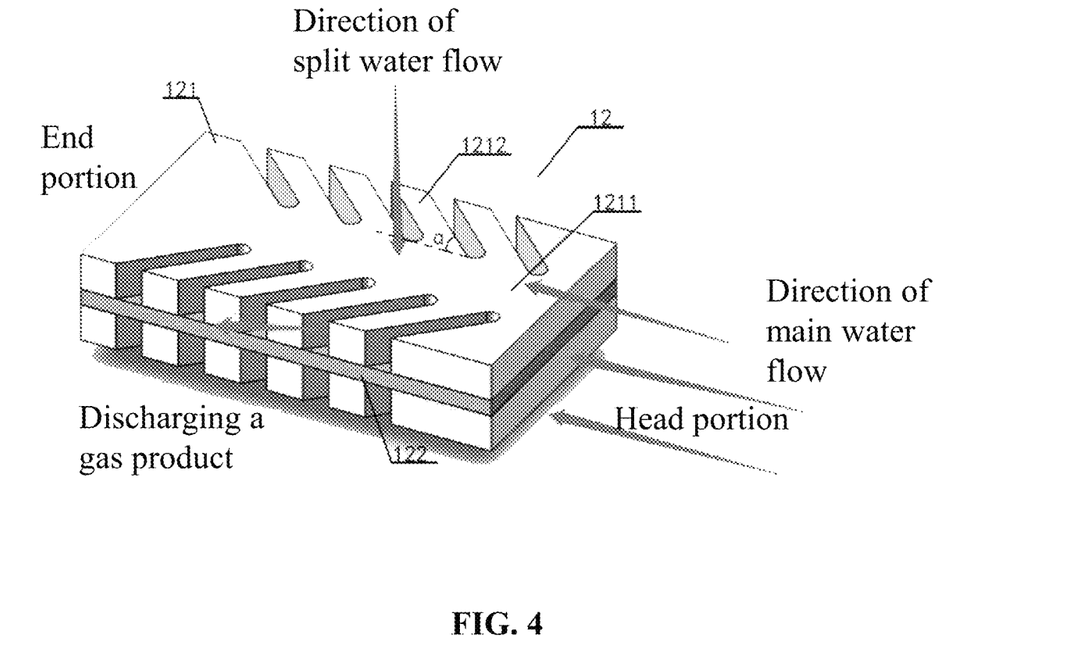
FIG. 4 is a schematic diagram illustrating an exemplary structure of an electrolytic module of an electrolytic module unit according to some embodiments of the present disclosure.
Figure 5:
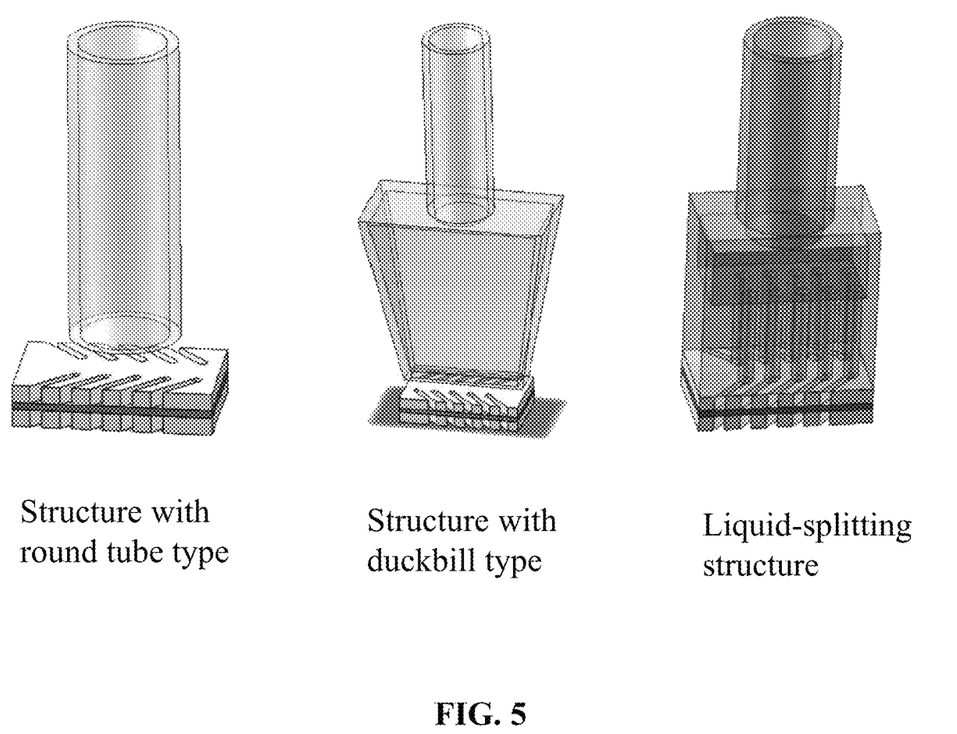
FIG. 5 is a schematic diagram illustrating an exemplary structure of a communicated end of a sub-inlet guide tube of a water flow guide module of an electrolytic module unit communicated with a cavity according to some embodiments of the present disclosure.

FIG. 3 is a schematic diagram illustrating an exemplary structure of a water treatment system according to some embodiments of the present disclosure. FIG. 4 is a schematic diagram illustrating an exemplary structure of an electrolytic module of an electrolytic module unit according to some embodiments of the present disclosure. FIG. 5 is a schematic diagram illustrating an exemplary structure of a communicated end of a sub-inlet guide tube of a water flow guide module of an electrolytic module unit communicated with a cavity according to some embodiments of the present disclosure.

As shown in FIGS. 3-4, an electrolytic module unit 1 includes a water flow guide module 11 and an electrolytic module 12. The electrolytic module 12 is provided within the water flow guide module 11.

In some embodiments, the electrolytic module 12 may include a boron-doped diamond (BDD) electrode 121.

The BDD electrode is an electrode made of diamond doped with boron. In some embodiments, the BDD electrode 121 includes a main body portion 1211 and a plurality of branch portions 1212 disposed on two sides of the main body portion 1211, the main body portion 1211 and the plurality of branch portions 1212 on two sides of the main body portion constitute a fishbone-like structure.

In some embodiments, the fishbone-like structure may be similar to a fish bone structure of a fish after shaving the head.

In some embodiments of the present disclosure, by setting the BDD electrode to include the main body portion and the plurality of branch portions disposed on the two sides of the main body portion, and the main body portion and the branch portions constituting the fishbone-like structure, as compared to the existing aperture plate electrode structure, the fishbone-like structure makes side slits between adjacent branch portions having no blind ends, thus gas generated during electrolysis may not block apertures. Meanwhile, under a joint action of the water flow guide module, the water flow is easy to flush the gas generated by the electrolytic module out when it passes through the electrolytic module, which realizes efficient discharge of a gas product. Further, it is easy for the water flow to take away impurities deposited on the electrolytic module, which reduces a probability of particles and impurities blocking the electrolytic module, ensures an effective electrolytic reaction area, and improves electrolytic efficiency and water treatment efficiency.

In some embodiments, a structure of each of the plurality of branch portions may be a wave shape.

In some embodiments of the present disclosure, by setting the structure of the each of the plurality of branch portions of the electrolytic module to the wave shape, periodic bumps and depressions may be formed on a surface of the electrolytic module, thereby increasing a texture and irregularity of the surface of the electrolytic module and improving an activity and selectivity of an electrolytic reaction.

At the same time, setting the surface of the electrolytic module to the wave shape also changes a flow path of the water flow in the cavity, increases a residence time of a solution in the electrolytic module, and is conducive to improving solute transfer and mixing efficiency.

In some embodiments, a distance (i.e., a width of a side slit) between adjacent branch portions 1212 may be within a range of 0.05 mm-2.5 mm, and a width of the each of the plurality of branch portions 1212 may be within a range of 0.05 mm-10 mm. An angle α between the each of the plurality of branch portions 1212 and the main body portion 1211 may be within a range of 0°-90°, and the main body portion is oriented in a direction of an end portion of the fishbone-like structure.

For example, the distance (i.e., the width of the side slit) between the adjacent branch portions 1212 may be 0.05 mm, the width of the each of the plurality of branch portions 1212 may be 0.05 mm, and the angle α between the each of the plurality of branch portions 1212 and the main body portion 1211 may be 0°.

As another example, the distance (i.e., the width of the side slit) between the adjacent branch portions 1212 may be 1.25 mm, the width of the each of the plurality of branch portions 1212 may be 5 mm, and the angle α between the each of the plurality of branch portions 1212 and the main body portion 1211 may be 45°.

As another example, the distance (i.e., the width of the side slit) between the adjacent branch portions 1212 may be 2.5 mm, the width of the each of the plurality of branch portions 1212 may be 10 mm, and the angle α between the each of the plurality of branch portions 1212 and the main body portion 1211 may be 90°.

In some embodiments, the end portion of the fishbone-like structure may denote a direction of an end of a fish, and a head portion of the fishbone-like structure may denote a direction away from the end of the fish. The angle α may refer to an acute or right angle between the branch portion 1212 and the main body portion 1211. In some embodiments, a maximum value of the angle α between the branch portion 1212 and the main body portion 1211 is 90°, i.e., two angles formed between the branch portion 1212 and the main body portion 1211 are 90°.

In some embodiments of the present disclosure, since processing devices for processing the fishbone-like structure are provided with certain specifications, a range of distance (i.e., the width of the side slit) between the adjacent branch portions are set to apply to the specifications of the processing devices to facilitate processing of the fishbone-like structure. Based on the design of the width of the side slit, by setting the width of the each of the plurality of branch portions to be within the range of 0.05 mm-10 mm, on the one hand, a reaction area of the BDD electrode in the electrolytic module in contact with the water may be ensured, thereby ensure the electrolytic efficiency, on the other hand, a strength of the BDD electrode may be ensured. Furthermore, the range of the width is favorable for discharging the gas generated by the electrolytic reaction.

By designing the angle between the each of the plurality of branch portions and the main body portion toward the end portion of the fishbone-like structure to be within the range of 0°-90°, it is advantageous to cooperate with the water flow, so that the gas generated in the side slit between the adjacent branch portions in the electrolytic process may be flushed away.

In some embodiments, the BDD electrode 121 is made by depositing a boron-doped diamond film on the substrate of the fishbone-like structure. A material of the substrate is selected from one of titanium, niobium, tantalum, nickel, monocrystalline silicon, polycrystalline silicon, silicon carbide monocrystal, silicon carbide ceramic, silicon nitride monocrystal, and silicon nitride ceramic.

In some embodiments, the substrate is manufactured by a diamond wire cutting manner.

After the substrate of the fishbone-like structure is processed by the diamond wire cutting manner, the substrate is placed into a concentrated suspension of diamond micropowder for ultrasonic treatment, and ultrasonic waves are utilized to drive the diamond micropowder to impact a surface of the substrate for surface treatment to increase a surface area. Then a boron-doped diamond film with a thickness of 0.5 μm-100 μm is deposited to obtain the BDD electrode of the fishbone-like structure. For example, a boron-doped diamond film with a thickness of 0.5 μm is deposited to obtain the BDD electrode of the fishbone-like structure. As another example, a boron-doped diamond film of 50 μm thickness is deposited to obtain the BDD electrode of the fishbone-like structure. As a further example, a boron-doped diamond film of 100 μm thickness is deposited to obtain the BDD electrode of the fishbone-like structure.

In some embodiments of the present disclosure, the fishbone-like structure of the BDD electrode originates from a fishbone-like structure of the substrate. After depositing the boron-doped diamond film on the substrate of the fishbone-like structure, the BDD electrode of the fishbone-like structure is obtained.

The above selection of the substrate is beneficial for the deposition of the boron-doped diamond film and makes the boron-doped diamond film less prone to fall off.

Additionally, the fishbone-like structure is obtained by side-cutting the substrate of the BDD electrode by using a diamond wire, which results in less processing stress and high strength of the substrate. The test confirms that the processing efficiency of diamond wire cutting processing is the highest, which may effectively improve the processing efficiency. In such a case, a problem of thermal expansion caused by laser hole cutting is avoided, which results in large residual stresses, leading to the processed BDD electrode being prone to have tiny cracks around a processing position.

In some embodiments, the BDD electrode 121 includes a BDD electrode as an anode and a BDD electrode as a cathode. An ionic membrane 122 is provided between the BDD electrode as the anode and the BDD electrode as the cathode. Which side of the BDD electrodes on both the upper and lower sides of ionic membrane 122 is the anode and which is the cathode is not shown in the figure. The anode and the cathode are identified according to the way the BDD electrodes communicate with positive and negative terminals of an external battery. The external battery is disposed outside the cavity 112, which is not shown in the figures.

In some embodiments of the present disclosure, the ionic membrane is placed between the BDD electrode as the anode and the BDD electrode as the cathode, forming a BDD sandwich structure to form an electrolyzer. Because the ionic membrane is selectively permeable to ions, charged ions are allowed to pass through. Through the ionic membrane as a fast channel, hydrogen ions from water electrolysis at the BDD electrode may quickly pass through the ionic membrane to meet electrolytic efficiency requirements. The electrolytic efficiency is higher after setting up the ionic membrane compared to relying on the ions in the water to realize electrolysis.

In some embodiments, the electrolytic module may further include a pressure sensor, a temperature sensor, a flow sensor, and a processor. In some embodiments, the processor may be configured to obtain pressure data, temperature data, and flow data for the sub-inlet guide tube in sequence based on the pressure sensor, the temperature sensor, and the flow sensor. The processor may also determine a target opening and closing degree of each sub-inlet guide tube based on the pressure data, the temperature data, and the flow data of the sub-inlet guide tube.

In some embodiments, the pressure sensor, the temperature sensor, and the flow sensor may be mounted within the sub-inlet guide tube and electrically communicated with the processor. The processor may be mounted anywhere on the outside of the cavity.

The pressure data refers to data related to a pressure inside the sub-inlet guide tube, e.g., pressure values on a wall of the sub-inlet guide tube at various moments. The pressure data reflects a change in the pressure value inside the sub-inlet guide tube caused by the gas generated by the water electrolysis in the electrolytic module unit.

The temperature data refers to data related to a temperature inside the sub-inlet guide tube, such as temperature values at various moments inside the sub-inlet guide tube. The temperature data may reflect a change in the temperature value inside the sub-inlet guide tube during the water electrolysis in the electrolytic module unit.

The flow data refers to data relating to a water flow in the sub-inlet guide tube, such as values of water flow at various moments in the sub-inlet guide tube. The flow data may reflect the water flow in the sub-inlet guide tube.

In some embodiments, the processor may obtain the pressure data, the temperature data, and the flow data within the sub-inlet guide tube in sequence via the pressure sensor, the temperature sensor, and the flow sensor.

The target opening and closing degree refers to an opening and closing degree of the sub-inlet guide tube. In some embodiments, the target opening and closing degree may be expressed as a percentage within 0-100%, with 0 representing that an inlet guide tube is closed and 100% representing that the inlet guide tube is fully open.

In some embodiments, the processor may determine, based on the pressure data, the temperature data, and the flow data corresponding to each sub-inlet guide tube, a target feature vector; determine, based on the target feature vector, an associated feature vector via a vector database; and determine a reference opening and closing degree corresponding to the associated feature vector as the target opening and closing degree.

The vector database contains a plurality of reference feature vectors. There exists a corresponding reference opening and closing degree for each reference feature vector. The reference feature vectors are feature vectors constructed based on historical pressure data, historical temperature data, and historical flow data.

The reference opening and closing degree corresponding to each reference feature vector may be the target opening and closing degree corresponding to electrolytic effect when an electrolytic effect satisfies the first preset condition within a historical preset time period (e.g., 1 h, 2 h, etc.). The electrolytic effect refers to an effect of the electrolytic reaction. For example, the electrolytic effect may include at least one of a rate of bubbles produced by the electrolysis, a pressure change value, an electrolytic time, or the like.

The first preset condition may be at least one of the rate of bubbles produced by the electrolysis being higher than a bubble rate threshold, the pressure change value being lower than a pressure change value threshold, the electrolytic time being lower than an electrolytic time threshold, or the like. The bubble rate threshold, the pressure change value threshold, and the electrolytic time threshold may be preset by a person skilled in the art based on experience.

The rate of bubbles produced by the electrolysis refers to a rate at which the gas produced in the electrolytic reaction forms bubbles in the liquid in the sub-inlet guide tube.

In some embodiments, the processor may determine the rate of bubbles produced by the electrolysis by operation 610-operation 613 as follows.

In 610, a video of an entire process of electrolyzing water via a camera device (e.g., a camera) may be obtained.

In 611, each frame in the video may be processed to identify a count of bubbles in each frame using an image processing algorithm based on the video.

The image processing algorithm may include an edge detection algorithm, a color filtering algorithm, or the like.

In 612, a count of bubbles produced per second may be determined based on the count of bubbles in each image frame.

In some embodiments, the processor may obtain images in all frames at any second contained in the video, and average the count of bubbles in each frame in the total count of frames as the count of bubbles produced per second.

In 613, a ratio of the count of bubbles produced per second to a volume of all water in the electrolytic module may be designated as the rate of bubbles produced by the electrolysis.

The pressure change value refers to a change value of a pressure value per unit of time during the electrolytic reaction in the sub-inlet guide tube. In some embodiments, the processor may determine a historical change value based on the pressure data over a historical preset time period (e.g., 1 h, 2 h, etc.). For example, the processor may take a ratio of a difference between pressure data corresponding to an initial moment and pressure data corresponding to an ending moment within a preset time period to a length of the preset time period as the pressure change value.

The electrolytic time refers to a total time taken for completing the electrolysis of a preset volume of water. The preset volume may be preset empirically by those skilled in the art. In some embodiments, the processor may determine a difference between a time point, recorded in a known database, at which water electrolysis is completed and a time point at which the water enters the electrolytic module unit as the electrolytic time.

In some embodiments, the processor may determine, based on the target feature vector, a reference feature vector in the vector database that meets a second preset condition, and determine the reference feature vector that meets the second preset condition as the associated feature vector. In some embodiments, the second preset condition may include a vector distance of the target feature vector satisfying a preset condition, etc. The second preset condition, such as the distance being less than a distance threshold, may be preset empirically for a person skilled in the art.

In some embodiments, the processor may determine a reference target opening and closing degree corresponding to the associated feature vector as the target opening and closing degree corresponding to the sub-inlet guide tube.

In some embodiments, the processor may also determine the target opening and closing degree of each sub-inlet guide tube through a opening and closing degree model based on the pressure data, the temperature data, and the flow data of the sub-inlet guide tube.

In some embodiments, the opening and closing degree model may be a machine learning model. In some embodiments, a type of the opening and closing degree model may include a convolutional neural network (CNN) and a neural network (NN), or the like.

In some embodiments, inputs of the opening and closing degree model may include the pressure data, the temperature data, and the flow data of each sub-inlet guide tube. Outputs of the opening and closing degree model may include the target opening and closing degree of each sub-inlet guide tube.

In some embodiments, the inputs of the opening and closing degree model may also include a first structural feature and a second structural feature of the BDD electrode. The first structural feature includes a structural feature of the fishbone-like structure. The second structural feature includes a structural feature of the wave shape when a structure of the branch portion is set to the wave shape.

The structural feature of the fishbone-like structure refers to a structural feature associated with the fishbone-like structure.

In some embodiments, the structural feature of the fishbone-like structure may include at least one of a count of the branch portion, a depth of the branch portion, a width of the branch portion, a distance between the adjacent branch portions, or the like.

The count of the branch portion refers to a total count of all of the branch portions in the electrolytic module.

The depth of the branch portion refers to a vertical depth of each branch portion.

The width of the branch portion refers to a width of each branch portion.

The distance between the adjacent branch portions refers to a width of the side slit that are spaced between the adjacent branch portions.

The structural feature of the wave shape refers to a structural feature associated with the wave shape.

In some embodiments, the structural feature of the wave shape may include at least one of a peak-to-valley height difference, a wave shape distance, or the like.

The peak-to-valley height difference refers to the maximum difference in height between peaks and valleys on the wave shape. The peak-to-valley height difference may reflect a undulation magnitude of the wave shape.

The wave shape distance refers to a distance between adjacent waves in each branch portion with the wave shape. The wave shape distance indirectly reflects a count of the waves set on each of the branch portion.

In some embodiments of the present disclosure, the first structural feature and the second structural feature are also taken into account in the inputs of the opening and closing degree model to enable a comprehensive assessment of the effects of different structures on the rate of producing bubbles, the pressure change value, the electrolytic time, etc., to further improve the accuracy of prediction of the opening and closing degree model.

Additionally, by introducing the second structural feature, the opening and closing degree model may be applicable to different structural types of electrolytic modules and is not limited to a current fishbone-like structure. Even if the structure of the electrolytic module is improved in the future or a newly structured electrolytic module is designed, the same opening and closing degree model may be utilized for prediction and optimization.

In some embodiments, the opening and closing degree model may be trained to be obtained based on a plurality of first training samples with first labels.

In some embodiments, each set of the first training samples may include pressure data, temperature data, and flow data of a historical sample sub-inlet guide tube. A first label may be the target opening and closing degree corresponding to the historical sample sub-inlet guide tube when the electrolytic effect meets a preset condition during a preset historical sample time period. More details regarding the electrolytic effect and the first preset condition may be found in the description above.

In some embodiments, the first training samples may be obtained through historical data, and the first label may be determined through manual labeling.

In some embodiments, the processor may input the pressure data, the temperature data, and the flow data of the historical sample sub-inlet guide tube in the first training samples with the first label, into an initial opening and closing degree model, construct a loss function through the first label and prediction results of the initial opening and closing degree model, update parameters of the initial opening and closing degree model by iterations based on the loss function until the loss function converges or a count of iterations reaches a threshold, etc., and complete the training to obtain a trained opening and closing degree model.

In some embodiments, the first training sample may further include a first structural feature and a second structural feature of a historical sample BDD electrode.

In some embodiments of the present disclosure, a trained opening and closing degree model enables a fast and accurate determination of the target opening and closing degree of each sub-inlet guide tube. Then the opening and closing degree of each sub-inlet guide tube is controlled by a switch 1131 to the target opening and closing degree.

The water flow guide module refers to a module that directs the water flow to a specified position. In some embodiments, the water flow guide module 11 includes a main inlet guide tube 111, a cavity 112, and a plurality of sub-inlet guide tubes 113, as shown in FIG. 3. The cavity 112 is communicated with the main inlet guide tube 111, and two sides of the cavity 112 are perpendicular to the main inlet guide tube 111. The plurality of sub-inlet guide tubes 113 are communicated with the cavity 112 and the main inlet guide tube 111, and an communicated end of each of the plurality of sub-inlet guide tubes 113 communicated with the cavity 112 is perpendicular to an upper surface of the cavity 112 or a lower surface of the cavity 112.

The cavity 112 may be configured to accommodate the electrode module as well as the water flow.

The main inlet guide tube 111 refers to a main pipe that directs the water flow into the cavity.

A sub-inlet guide tube 113 refers to a branch pipe that directs the water flow into the cavity.

In some embodiments, the electrolytic module 12 is arranged in the cavity 112 and parallel to the upper surface and the lower surface of the cavity 112, and an end portion of the BDD electrode 121 of the fishbone-like structure is far away from a direction of the main inlet guide tube 111, and a head portion is toward the main inlet guide tube 111. That is to say, as shown in FIG. 4, a direction of the BDD electrode 121 of the fishbone-like structure from the head portion to the end portion is in the same direction as a direction of a main water flow formed by the main inlet guide tube 111.

In some embodiments of the present disclosure, the direction of the main water flow is controlled by the main inlet guide tube of the water flow guide module, a direction of a split water flow is controlled by the sub-inlet guide tube. Two sides of the cavity are perpendicular to the main inlet guide tube so that the direction of the main water flow is the same as the direction of the BDD electrode of the fishbone-like structure from the head portion to the end portion. The communicated end of the sub-inlet guide tube and the cavity is perpendicular to the upper surface and the lower surface of the cavity, so that the direction of the split water flow is perpendicular to the BDD electrodes of the fishbone-like structure. That is, the split water flow may flush the side slits between the adjacent branch portions to flush out the gas in the side slits, and the flushed gas is carried away under the action of the main water flow. Thereby realizing the interplay between the electrolytic module including the BDD electrode of the fishbone-like structure and the water flow guide module, improving gas discharge efficiency as well as sediment discharge efficiency, and ensuring an effective electrolytic reaction area, thus guaranting the electrolytic efficiency.

Additionally, the interplay of the electrolytic module including the BDD electrode of the fishbone-like structure and the water flow guide module of the present disclosure also results in relatively high cooling efficiency of the water flow to the electrolytic module, which may solve a problem of heat generation of the BDD electrode in the electrolytic process. Current density per unit area of the electrode is higher compared to the prior art, and thus higher electrolytic efficiency may be obtained.

In some embodiments, a ratio of a diameter of the sub-inlet guide tube 113 to a diameter of the main inlet guide tube 111 is within a range of 1:1-1:20. For example, the ratio of the diameter of the sub-inlet guide tube 113 to the diameter of the main inlet guide tube 111 is 1:1. As another example, the ratio of the diameter of the sub-inlet guide tube 113 to the diameter of the main inlet guide tube 111 is 1:10. For another example, the ratio of the diameter of the sub-inlet guide tube 113 to the diameter of the main inlet guide tube 111 is 1:20.

In some embodiments of the present disclosure, by designing the ratio of the diameter of the sub-inlet guide tube 113 to the diameter of the main inlet guide tube 111 to be within the range of 1:1-1:20, water flow rates of the main water flow and the split water flow may be effectively controlled, which may in turn control a water flow rate of water in each path, to realize efficient discharge of gas.

In some embodiments of the present disclosure, the water flow in the sub-inlet guide tube 113 is controlled by the switch 1131 having pulse control characteristics.

In some embodiments of the present disclosure, by providing the switch on the sub-inlet guide tube, the opening and closing of the split water flow and the water flow rate may be controlled. The pulse control characteristics are realized by a frequency of the switch on the sub-inlet guide tube, and a pulsed water flow is more conducive to disengaging and discharging air bubbles generated on the BDD electrode.

In some embodiments, as shown in FIG. 5, an end (i.e., the communicated end) of the sub-inlet guide tube 113 communicated with the cavity 112 is a structure with round tube type, a structure with duckbill type, or a liquid-splitting structure.

In some embodiments of the present disclosure, by designing the end of the sub-inlet guide tube communicated with the cavity as the structure with round tube type, the structure with duckbill type, or the liquid-splitting structure corresponding to the branch portions of the fishbone-like structure, it is beneficial to make the water flow introduced by the sub-inlet guide tube to flush the side slits between the two adjacent branch portions. In particular, the liquid-splitting structure, in which each branch tube corresponds to a side slit, is more effective in flushing the side slits, and is more efficient in discharging gas.

In some embodiments, the end of the sub-inlet guide tube 113 communicated with the cavity 112 may be the liquid-splitting structure. In some embodiments, the liquid-splitting structure includes a plurality of branch tubes, with each branch tube corresponding to a side slit, for better flushing of the side slits and more efficient gas discharge.

In some embodiments, the electrolytic module unit may further include a plurality of oscillating electrode devices. The plurality of oscillating electrode devices are deployed at a plurality of different positions around the BDD electrodes, and the plurality of oscillating electrode devices are configured to vibrate the water flow within the cavity.

The oscillating electrode devices allow the BDD electrode to vibrate periodically in the water.

In some embodiments, the oscillating electrode devices may include a sonic vibrator. The sonic vibrator refers to a device that periodically vibrates the BDD electrode in solution using localized mechanical vibrations generated by ultrasound waves propagating in a liquid.

In some embodiments, the plurality of oscillating electrode devices may be integrated on the water flow guide module.

In some embodiments of the present disclosure, ultrasonic waves generated by the plurality of oscillating electrode devices may generate the localized mechanical vibrations when propagating in the liquid, thereby causing vibration and flow of liquid molecules, resulting in mixing and convection of the liquid molecules. The manner increases a contact area between the solute and the solvent in the liquid and promotes a mixing and mass transfer process of the liquid, which improves the reaction efficiency in the electrolytic process and the performance of the water treatment system. The mass transfer process refers to a process of mass transfer that occurs as a result of uneven concentration of the liquid.

In some embodiments, the electrolytic module unit may further include a concentration monitoring unit. The processor may be further configured to construct an oscillating parameter map based on a position of the concentration monitoring unit, a position of the oscillating electrode device, concentration data collected by the concentration monitoring unit, and candidate oscillating parameters of the oscillating electrode device; and determine a predicted electrolytic effect of each of the candidate oscillating parameters of the oscillating electrode device based on the oscillating parameter map via an oscillation parameter model.

The concentration monitoring unit refers to a device for obtaining concentrations of a liquid at a plurality of positions in the electrolytic module unit. For example, the concentration monitoring unit may include at least one of an electrochemical sensor, a chromatograph, a mass spectrometer, an optical sensor, or the like.

The position of the concentration monitoring unit refers to one or more positions on the electrolytic module unit where the concentration monitoring unit is placed. By placing the concentration monitoring unit at a plurality of positions of the electrolytic module unit, detection of a solution concentration at a plurality of different positions during the electrolytic process is realized, so as to further determine whether the electrolytic process is uniform or whether the electrolytic process is stable.

In some embodiments, in response to the solution concentration being the same at the plurality of different positions obtained at a plurality of different time points, the processor may determine that the electrolytic process is uniform.

In some embodiments, in response to the concentration of solution being the same at the plurality of different positions obtained at a plurality of different time points within a preset time period (e.g., 1 h, etc.), the processor may determine that the electrolytic process is stable.

The position of the oscillating electrode device refers to a position where the oscillating electrode device is placed on the electrolytic module unit.

The concentration data refers to data on a concentration of a chemical substance in a solution.

The candidate oscillating parameters refer to parameters alternatively used to control the oscillating electrode device. For example, the candidate oscillating parameters may include an oscillation frequency, an oscillation amplitude, etc. of an alternative oscillating electrode device. In some embodiments, the processor may take any plurality of sets of historical oscillating parameters, based on a historical database, as a plurality of sets of candidate oscillating parameters. The historical database refers to a database in which the plurality of sets of historical oscillating parameters are stored.

The oscillating parameter map refers to a data structure map constructed from the position of the concentration monitoring unit and the position of the oscillating electrode device.

In some embodiments, the oscillating parameter map consists of a data structure of nodes and edges, with the edges connecting the nodes, and the nodes and the edges may have attributes.

In some embodiments, a node of the oscillating parameter map may correspond to a position of a concentration monitoring unit on the electrolytic module unit or a position of the oscillating electrode device. Attributes of the nodes may reflect features that correspond to the position of the concentration monitoring unit or the position of the oscillating electrode device. For example, the attributes of the nodes may include the concentration data of the position of the concentration monitoring unit, the candidate oscillating parameters of the position of the oscillating electrode device, or the like.

In some embodiments, an edge exists between any two nodes whose distance is less than a preset distance threshold.

In some embodiments, the processor may determine, by a preset algorithm, a distance between any two nodes based on a position of a concentration monitoring unit corresponding to each of the nodes on the oscillating parameter map or the position of the oscillating electrode device. The preset algorithm may include a Euclidean distance or a cosine similarity, etc.

The preset distance threshold may be preset for those skilled in the art based on experience. Attributes of the edges may reflect relevant characteristics of the edge that is concatenated by any two nodes whose distance is less than the preset distance threshold. For example, the attributes of the edges may include a distance between positions of any two concentration monitoring units and/or a distance between positions of any two oscillating electrode devices, which are less than the preset distance threshold.

The predicted electrolytic effect refers to an electrolytic effect that is predicted. For example, the predicted electrolytic effect may include at least one of a predicted rate of bubbles produced by the electrolysis, a predicted pressure change value, a predicted electrolytic time, or the like. For a description of the rate of bubbles produced by the electrolysis, the pressure change value, and the electrolytic time, see the description above.

In some embodiments, the oscillating parameter model may be a graph neural network (GNN) model. An output of the oscillating parameter model is the predicted electrolytic effect of the candidate shock parameter corresponding to the node.

In some embodiments, the oscillating parameter model may be trained based on a plurality of second training samples with second labels.

In some embodiments, each set of the second training samples may include a historical sample oscillating parameter map. The historical sample oscillating parameter map refers to the oscillating parameter map constructed from the position of the concentration monitoring unit and the position of the oscillating electrode device on the historical sample electrolytic module unit.

In some embodiments, the second training sample may be the oscillating parameter map constructed by obtaining the position of the concentration monitoring unit and the position of the oscillating electrode device on the historical sample electrolytic module unit through historical data.

In some embodiments, a second label may be an actual electrolytic effect corresponding to a historical sample oscillating parameter.

The second label may be determined by manual labeling.

In some embodiments, the processor may obtain the electrolytic module unit of the oscillating electrode device having each historical sample oscillating parameter, a rate of bubbles produced by an actual electrolysis, the pressure change value, and the electrolytic time. Besides, the processor takes a weighted sum of the rate of bubbles produced by the electrolysis, the pressure change value, and the electrolytic time as an actual electrolytic effect corresponding to the historical sample oscillating parameter.

Merely by way of example, the actual electrolytic effect corresponding to the historical sample oscillating parameter may be obtained by an Equation (1) as follows:

The actual electrolytic effect corresponding to the historical sample oscillating parameter = $k1 *$ rate of bubbles produced by electrolysis +

$k2 *$ pressure change value + $k3 *$ electrolytic time (1);

Wherein k1, k2, and k3 are greater than 0 and less than 1 and are preset by the person skilled in the art based on experience.

In some embodiments, the rate of bubbles produced by the electrolysis may be positively correlated with k1, e.g., the faster the rate of bubbles produced by the electrolysis, the larger the value of k1 may be preset.

In some embodiments, the pressure change value may be negatively correlated with k2, e.g., the smaller the pressure change value, the larger the value of k2 may be preset.

In some embodiments, the electrolytic time may be negatively correlated with k3, e.g., the shorter the electrolytic time is, the larger the value of k3 may be preset. By setting the rate of bubbles produced by the electrolysis to be positively correlated with k1, the pressure change value to be negatively correlated with k2, and the electrolytic time to be negatively correlated with k3, accuracy of the actual electrolytic effect corresponding to the finalized historical sample oscillating parameter may be improved.

In some embodiments, the larger the value of the actual electrolytic effect corresponding to the historical sample oscillating parameter obtained by calculation based on the equation (1), the better the actual electrolytic effect corresponding to the historical sample oscillating parameter.

Some embodiments of the present disclosure, determine the predicted electrolytic effect of the oscillating electrode device under different oscillating parameters more accurately through the oscillating parameter model, which helps to screen out the candidate oscillating parameter with the best predicted electrolytic effect as the oscillating parameter of the oscillating electrode device to oscillate, ensuring the electrolytic effect.

As shown in FIG. 3, in some embodiments, the water treatment system includes an electrolytic module unit 1. The water treatment system of the embodiment further includes a filtration module 2 and a gas-liquid mixing module 3. The electrolytic module unit 1 is disposed between the filtration module 2 and the gas-liquid mixing module 3, the electrolytic module unit 1 is communicated with the filtration module 2 through an inlet channel 4, and the electrolytic module unit 1 is communicated with the gas-liquid mixing module 3 through an outlet channel 5.

The filtration module 2 is configured to filter impurities in the water flow. For example, the filtration module 2 may be configured to filter out particles and suspended matter, etc., from the water flow.

The gas-liquid mixing module 3 is configured to mix the ozone generated by the electrolytic reaction more thoroughly with water.

In some embodiments of the present disclosure, the water treatment system includes the electrolytic module unit, the filtration module, and the gas-liquid mixing module of the present disclosure. Before the water flow enters the electrolytic module unit, it is pre-filtered by the filtration module, which is capable of filtering out some of the particles and suspended matter therein. In such a case, these particles and suspended matter are prevented from electrochemically flocculating and turning into large particles to block the side slits between the two adjacent branch portions when the electrolytic module unit performs an electrolytic treatment. Additionally, the water flows through the electrolytic module unit and then passes through the gas-liquid mixing module for gas-liquid mixing, so that the ozone generated by the electrolytic reaction mixes more fully with the water, which may effectively increase a concentration of ozone in the water after the treatment, and increase an elimination and treatment effect.

In some embodiments, the filtration module 2 is a filtration module that includes a backwash function, and a diameter of a filtration membrane 21 of the filtration module 2 is within a range of 0.2 μm-75 μm. For example, the diameter of the filtration membrane 21 of the filtration module 2 is 0.2 μm. As another example, the diameter of the filtration membrane 21 of the filtration module is 37.5 μm. As yet another example, the diameter of the filtration membrane 21 of the filtration module 2 is 75 μm. The gas-liquid mixing of the gas-liquid mixing module 3 utilizes a microporous aeration manner and/or a spiral mixing manner. A ratio of a cross-sectional area of the inlet channel 4 between the filtration module 2 and the electrolytic module unit 1 to a cross-sectional area of the outlet channel 5 between the electrolytic module unit 1 and the gas-liquid mixing module 3 is within a range of 1:3-20:1. For example, the ratio of the cross-sectional area of the inlet channel 4 between the filtration module 2 and the electrolytic module unit 1 to the cross-sectional area of the outlet channel 5 between the electrolytic module unit 1 and the gas-liquid mixing module 3 is 1:3.

As another example, the ratio of the cross-sectional area of the inlet channel 4 between the filtration module 2 and the electrolytic module unit 1 to the cross-sectional area of the outlet channel 5 between the electrolytic module unit 1 and the gas-liquid mixing module 3 is 20:1.

As yet another example, the ratio of the cross-sectional area of the inlet channel 4 between the filtration module 2 and the electrolytic module unit 1 to the cross-sectional area of the outlet channel 5 between the electrolytic module unit 1 and the gas-liquid mixing module 3 is 10:1.

In some embodiments of the present disclosure, the filtration membrane holes can be prevented from being blocked by setting the filtration module to have the backwash function. At the same time, it is possible to discharge a filtered substance on time to ensure an outflow rate of a filtered liquid.

By setting the diameter of the filtration membrane to be within the range of 0.2 μm-75 μm, particles and suspended matter with diameters in this range may be filtered out. As a result, these particles and suspended matter may be prevented from electrochemical flocculating and turning into large particles to block the side slits between the two adjacent branch portions when the electrolytic module unit performs the electrolytic treatment, which avoids problems such as large particles being difficult to be discharged through the side slits.

By using the microporous aeration manner and/or the spiral mixing manner, gas and liquid are more fully mixed.

By designing the ratio of the cross-sectional area of the inlet channel between the filtration module and the electrolytic module unit to the cross-sectional area of the outlet channel between the electrolytic module unit and the gas-liquid mixing module to be within the range of 1:3-20:1, then processing efficiency of the electrolytic module unit and processing efficiency of the gas-liquid mixing module processing efficiency with the electrolytic treatment coordinate, which ensures the electrolytic treatment and the gas-liquid mixing more efficient while ensuring overall processing efficiency of the entire water treatment system.

The water treatment system of this embodiment operates as follows. Water to be treated is passed into the filtration module 2, and the water filtered by the filtration module 2 enters into the main inlet guide tube 111 and the sub-inlet guide tube 113 through the inlet channel 4, then enters the cavity 112. The electrolytic module 12 within the cavity 112 performs the electrolytic treatment on the water under power supply of the external battery. The external battery is located outside the cavity 112 and is not shown in the figure. After the electrolytic treatment, the water flows out of the cavity 112 through the outlet channel 5 and into the gas-liquid mixing module 3, mixes with the ozone generated by the electrolytic reaction sufficiently, and then flows out. The sub-inlet guide tube 113 is provided with the switch 1131, which may control the opening and closing of the sub-inlet guide tube 113 and the water flow rate of the sub-inlet guide tube 113 according to the need.

The electrolytic module 12 is generally susceptible to deposition of calcium and magnesium ions in water on a surface of the cathode during electrolysis, and the anode is susceptible to electrochemical corrosion. The embodiment may be controlled by circuitry to reverse positive and negative electrodes of the battery after a period of time. Then, the cathode and the anode of the electrolytic module are interchanged, i.e., the original cathode becomes the anode, and the original anode becomes the cathode. A sedimentary layer deposited on the original cathode may be cleaned up after the original cathode is reversed to become the anode, which reduces a probability of blocking with particles, prolongs the service life of the electrode, and improves the electrolytic efficiency.

In some embodiments of the present disclosure, using the electrolytic module unit based on the BDD electrodes and the water treatment system solves the problem of a reduction of the effective working area hindering efficient electrolytic reaction caused by the difficulty in discharging on time the gas, such as hydrogen, ozone, and oxygen, generated during electrolysis of the existing BDD electrodes. It also solves the problem that when the water to be treated contains particles or impurities that are deposited during the electrochemical reaction, it is easy to block a vent (or a tank), which reduces the electrolytic efficiency.

In some embodiments, the electrolytic module unit may include the water flow guide module and the electrolytic module. Wherein, the electrolytic module is provided within the water flow guide module. The electrolytic module includes a BDD electrode. The BDD electrode includes the main body portion and the plurality of branch portions disposed on two sides of the main body portion, and the main body portion and the plurality of branch portions on two sides of the main body portion constitute the fishbone-like structure. The water flow guide module includes the main inlet guide tube and the plurality of sub-inlet guide tubes. The cavity is communicated with the main inlet guide tube and two sides of the cavity are perpendicular to the main inlet guide tube. The plurality of sub-inlet guide tubes are communicated with the cavity and the main inlet guide tube, and the communicated end of each of the plurality of sub-inlet guide tubes communicated with the cavity is perpendicular to the upper surface and the lower surface of the cavity.

In some embodiments, the electrolytic module is disposed within the cavity and parallel to the upper surface and the lower surface of the cavity, and the end portion of the BDD electrode of the fishbone-like structure is far away from a direction of the main inlet guide tube.

In some embodiments, the distance between the adjacent branch portions is within a range of 0.05 mm-2.5 mm, the width of each branch portion is within a range of 0.05 mm-10 mm, and the angle between each branch portion and the main body portion toward the end portion of the fishbone-like structure is within a range of 0-90°.

In some embodiments, the BDD electrode is a BDD electrode fabricated by depositing the boron-doped diamond film on the substrate with the fishbone-like structure. The material of the substrate is selected from one of titanium, niobium, tantalum, nickel, monocrystalline silicon, polycrystalline silicon, silicon carbide monocrystalline, silicon carbide ceramic, silicon nitride monocrystalline, and silicon nitride ceramic. The substrate is processed by a diamond wire cutting manner.

In some embodiments, the BDD electrode includes the BDD electrode acting as the anode and the BDD electrode acting as the cathode, and the ionic membrane is provided between the BDD electrode acting as the anode and the BDD electrode acting as the cathode.

In some embodiments, the ratio of the diameter of the sub-inlet guide tube to the diameter of the main inlet guide tube is within a range of 1:1-1:20.

In some embodiments, the water flow in the sub-inlet guide tube is controlled by the switch having pulse control characteristics.

In some embodiments, the end of the sub-inlet guide tube communicated with the cavity is of the structure with round tube type, the structure with duckbill type, or the liquid-splitting structure.

More descriptions of the structures involved in the water treatment system may be found in the relevant descriptions in FIG. 4-FIG. 5.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An electrolytic module unit based on a boron-doped diamond (BDD) electrode, comprising a water flow guide module and an electrolytic module, wherein
    the electrolytic module is provided within the water flow guide module;
    the electrolytic module includes a BDD electrode, the BDD electrode includes a main body portion and a plurality of branch portions disposed on two sides of the main body portion, and the main body portion and the plurality of the branch portions on the two sides of the main body portion constitute a fishbone-like structure;
    the water flow guide module includes a main inlet guide tube, a cavity, and a plurality of sub-inlet guide tubes, wherein the cavity is communicated with the main inlet guide tube and two sides of the cavity are perpendicular to the main inlet guide tube; the plurality of the sub-inlet guide tubes are communicated with the cavity and the main inlet guide tube, and an communicated end of the each of the plurality of the sub-inlet guide tube communicated with the cavity is perpendicular to an upper surface or a lower surface of the cavity; and
    the electrolytic module is arranged in the cavity and parallel to the upper surface and the lower surface of the cavity, and an end portion of the BDD electrode of the fishbone-like structure is far away from the main inlet guide tube.

2. The electrolytic module unit of claim 1, wherein a distance between adjacent branch portions is within a range of 0.05 mm-2.5 mm, a width of each of the plurality of the branch portions is within a range of 0.05 mm-10 mm, an angle between the each of the plurality of the branch portions and the main body portion is within a range of 0°-90°, and the main body portion is oriented in a direction of an end portion of the fishbone-like structure.

3. The electrolytic module unit of claim 1, wherein the BDD electrode is made by depositing a boron-doped diamond film on a substrate of the fishbone-like structure; a material of the substrate includes one of titanium, niobium, tantalum, nickel, monocrystalline silicon, polycrystalline silicon, silicon carbide monocrystal, silicon carbide ceramics, silicon nitride monocrystal, and silicon nitride ceramics; and the substrate is processed by a diamond wire cutting manner.

4. The electrolytic module unit of claim 1, wherein the BDD electrode includes a BDD electrode acting as an anode and a BDD electrode acting as a cathode, and an ionic membrane is provided between the BDD electrode acting as the anode and the BDD electrode acting as the cathode.

5. The electrolytic module unit of claim 1, wherein a ratio of a diameter of the sub-inlet guide tube to a diameter of the main inlet guide tube is within a range of 1:1-1:20.

6. The electrolytic module unit of claim 1, wherein a water flow in the sub-inlet guide tube is controlled by a switch having pulse control characteristics.

7. The electrolytic module unit of claim 1, wherein one end of the sub-inlet guide tube communicated with the cavity is a structure with round tube type, a structure with duckbill type, or a liquid-splitting structure.

8. A water treatment system comprising an electrolytic module unit of any one of claim 1, wherein the water treatment system further includes a filtration module and a gas-liquid mixing module, the electrolytic module is located between the filtration module and the gas-liquid mixing module, the electrolytic module is communicated with the filtration module through an inlet channel, and the electrolytic module is communicated with the gas-liquid mixing module through an outlet channel.

9. The water treatment system of claim 8, wherein the filtration module includes a backwash function, and a diameter of a filtration membrane of the filtration module is within a range of 0.2-75 μm;
    the gas-liquid mixing module uses microporous aeration and/or spiral mixing to mix liquid and gas; and
    a ratio of a cross-sectional area of the inlet channel between the filtration module and the electrolytic module unit to a cross-sectional area of the outlet channel between the gas-liquid mixing module and the electrolytic module unit is within a range of 1:3-20:1.

* * * * *